Nov. 13, 1928.  
E. W. ACKERMAN ET AL  
1,691,876  
REBOUND DEVICE RELIEF VALVE  
Filed Dec. 13, 1926
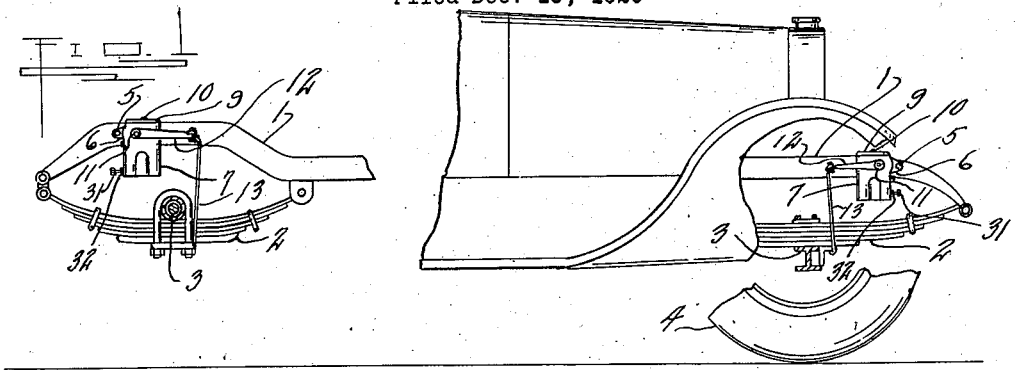
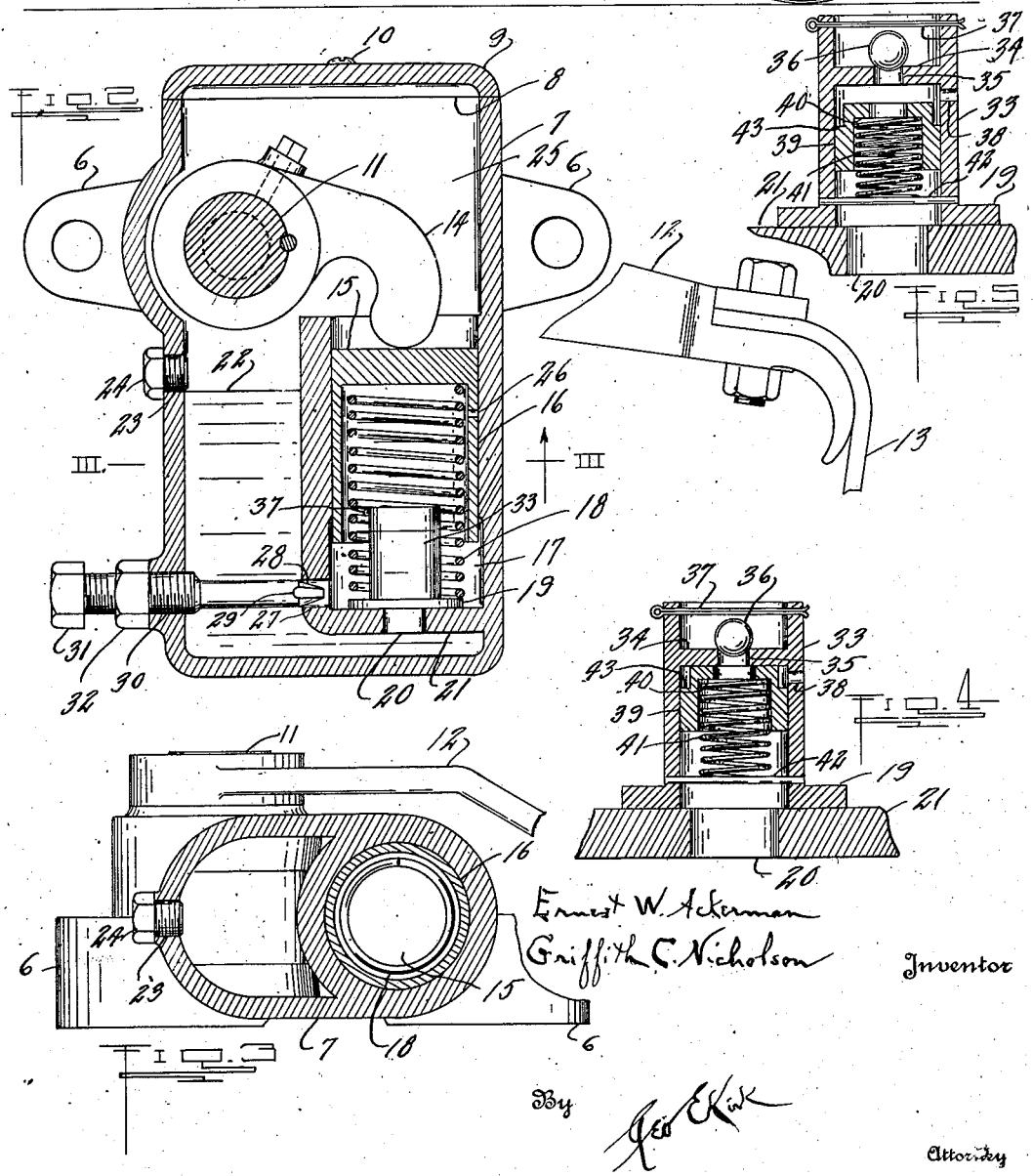
Ernest W. Ackerman  
Griffith C. Nicholson  
Inventor
By  
Attorney Patented Nov. 13, 1928.

1,691,876

UNITED STATES PATENT OFFICE.

ERNEST W. ACKERMAN AND GRIFFITH C. NICHOLSON, OF MONROE, MICHIGAN, ASSIGNORS TO HYDRO-CHECK CORPORATION, OF MONROE, MICHIGAN, A CORPORATION OF MICHIGAN.

REBOUND-DEVICE RELIEF VALVE.

Application filed December 13, 1926. Serial No. 154,428.

This invention relates to intake and relief valve structures.

This invention has utility when incorporated in dash-pot devices or rebound absorbers, more particularly as to features of relief valve, and relief valve and intake valve units.

Referring to the drawings:

Fig 1 is a fragmentary side elevation of an embodiment of the invention in a motor vehicle;

Fig. 2 is an enlarged view in section of the device of Fig. 1;

Fig. 3 is a section on the line III—III Fig. 2 looking in the direction of the arrow;

Fig. 4 is a detail view in section of the intake and relief valve device in closed position at both valves; and Fig. 5 is a detail view in section of this intake and relief valve unit with the relief valve in open position.

Motor vehicle chassis or frame 1 is shown as spaced by springs 2 from axles 3 carrying wheels 4. Bolts 5 through ears 6 mount housing 7 fast with the frame 1. This housing 7 is shown as having top opening 8 covered by cap 9 fixed in position by bolts 10. Through this housing 7 extends rock shaft 11 carrying arm 12 fixed therewith and having flexible extension or strap 13 anchored with the axle 3, whereby relative movement of the axle as to the vehicle may rock the shaft 11 as to the housing 7 and thus arm 14 serves as operating means for thrusting piston head 15 having skirt 16. This thrusting or piston head 15 is into cylinder 17 and against the resistance of compression helical spring 18. This spring 18, as abutting the inside of the head 15 of the piston, is thrust against flange 19 holding such flange seated in position about port 20 in cylinder head 21 in the housing 7 spaced from the bottom of such housing to be in communication with liquid 22 as charged in this housing 7 through opening 23 having closure plug 24 to leave air chamber 25 above the piston 15.

This piston 15 has in its skirt 16, port 26, in piston reciprocation, movable above the level of the liquid 22 for taking in air and thus serving as a pump for replenishing compressible medium in the skirted piston 15, 16.

The cylinder 17 near the head 21 has lateral port 27 into which protrudes tapered stem 28 having flat seepage insurance portion 29. This stem 28 has threaded portion 30 for adjustment as to the housing 7 by head 31. At the desired seepage adjustment rate for this stem 28, nut 32 is operated to lock the stem in such position. The flange 19, as positioned by compression spring 18, has upwardly extending tubular member 33 therefrom having inwardly extending ledge 34 providing central port 35 normally closed by check valve ball 36 retained from jumping clear thereof by pin 37. This ball 36 is an intake check valve allowing free flow of liquid into the cylinder 17 but checking flow therefrom.

Upon the opposite side of this ledge 34 from the ball 36, the tubular member 33 is provided with lateral port 38. The tubular member serves as a guide for sleeve or plunger 39 having inwardly extending flange 40 normally abutting the ledge 34 on the opposite side of the ledge 34 from the ball 36. This flange 40 is engaged by compression helical spring 41 positioned by pin 42 through the tubular member 33 adjacent the flange 19. There is accordingly provided a seating of this plunger 39 for shutting off communication between the port 38 and the port 20.

This plunger 39 is provided with shoulder 43 at all times in communication with the port 38 so that as the piston operating means 14 is effective to overcome the action of the spring 18 and the action of the compressible medium in this skirted piston 15, 16, the pressure thereafter built up by the compressible medium 22 may not be disastrous to the housing 7. As this resistance is built up beyond the seepage rate insurance of the port 27 the pressure transmitted by the liquid 22 to the shoulder 43 through the port 38 may be effective against the resistance of the spring 41 to shift the plunger 39 clear of seating against the ledge 34 thereby to allow oil flow from the cylinder 17 by way of the ports 38, 20, into the housing 7. There is thus provided herein a cylinder relief valve unit combined with the intake valve.

A decrease in pressure, upon slowing up of the action of the arm 14, results in the spring 41 seating the plunger 39 to hold the device for slower movement as determined by the tapered stem 28, which movement is resisted by the spring 18. If the spring 18 be predominant to lift the piston 15, the intake check valve ball 36 tends to lift to permit replenishment of the liquid into the cylinder 17.

What is claimed and it is desired to secure by Letters Patent is:

1. A dash-pot device comprising a piston and cylinder, a first port for one thereof to said cylinder, a flanged member at said port having a tubular portion therefrom as a guide and provided with a lateral second port from the cylinder spaced from the first port by a region in said cylinder, a plunger directed by said guide in its movement to open and close said second port, and a spring normally urging the plunger to shut off communication between said ports.

2. A dash-pot device comprising a piston and cylinder, a first port for one thereof to said cylinder, a flanged member at said port having a tubular portion therefrom as a guide and provided with a lateral second port from the cylinder spaced from the first port by a region in said cylinder, and a ledge adjacent said second port, a plunger directed by said guide in its movement to open and close said port, said plunger having a shoulder at all times in communication with said lateral port, and a spring normally urging the plunger into seating position at said ledge to shut off communication between said ports whereby pressure through said lateral port may act on said shoulder to unseat said plunger against the resistance of said spring.

3. A dash-pot device intake check and relief valve unit comprising an intake check valve, a relief valve, a tubular member having intermediate its extent a ledge and a lateral port on one side of said ledge and said valves on opposite sides of said ledge movable away therefrom to opening positions.

4. A dash-pot device intake check and relief valve unit comprising a tubular member having a ledge providing a central port, and an additional port on one side of said ledge, a ball check valve coacting with the central port on the side thereof away from said lateral port, a plunger coacting with the lateral port, and means normally holding the plunger against the ledge on the side thereof away from said ball check valve.

5. A dash-pot device intake check and relief valve unit comprising a tubular member having a ledge and providing a central port and an additional lateral port on one side of said ledge a ball check valve coacting with the central port on the side thereof away from said lateral port, a shouldered plunger reciprocable in the tubular member, and a compression spring normally holding the plunger against said ledge to shut off communication between said ports, said plunger shoulder being exposed at all times to pressure through the lateral port as tending to overcome the resistance of said spring.

6. A dash-pot device comprising a piston and cylinder, a first port for one thereof to said cylinder, said cylinder having a head, a tubular member extending from said head as a guide and provided with a lateral second port from the cylinder spaced from its first port by a region in said cylinder, a plunger directed by said guide in its movement to open and close said second port, and a spring normally urging the plunger to shut off communication between said ports.

In witness whereof we affix our signatures.

ERNEST W. ACKERMAN.
GRIFFITH C. NICHOLSON.